Aug. 8, 1933.   T. H. STRACHAN   1,921,436
POISE ATTACHMENT
Filed Sept. 17, 1930

Inventor
Thomas H. Strachan
By his Attorney

/ Patented Aug. 8, 1933

1,921,436

UNITED STATES PATENT OFFICE 1,921,436

POISE ATTACHMENT

Thomas H. Strachan, Dayton, Ohio, assignor to Dayton Scale Company, Dayton, Ohio, a Corporation of New Jersey Application September 17, 1930
Serial No. 482,462

2 Claims. (Cl. 265—49)

The present invention relates to improvements in weighing scales generally and in particular to the poise of such scales.

The primary object of this invention is to provide a novel and improved poise which has provisons for preventing accidental and undesirable displacement of the poise lengthwise of the scale beam.

It is the custom to construct scale beams with notches opposite each graduation for the purpose of accurately centering the poise which has a loop or hook having a knife edge cooperating with the notches. The knife edge permits the poise to hang freely and prevents any tendency of the poise to shift in a manner tending to alter the ratio between the respective distances from the fulcrum to the point of application of the load and to the effective point of application of the force due to the weight of poise.

An important object of the present invention is to provide a novel construction which positively prevents the poise from being accidentally displaced from its selectively set position owing to its having been inadvertently struck or the scale beam having been vibrated suddenly from any cause incidental to a weighing operation and which at the same time permits the poise to be manually set to coincide with any desired graduation on the beam.

Further objects and advantages of this invention will be more apparent after a study of the following specification and claims and the accompanying drawing which, by way of illustration, show what, for the present at least, is considered a preferred embodiment of the invention.

Figure 1:
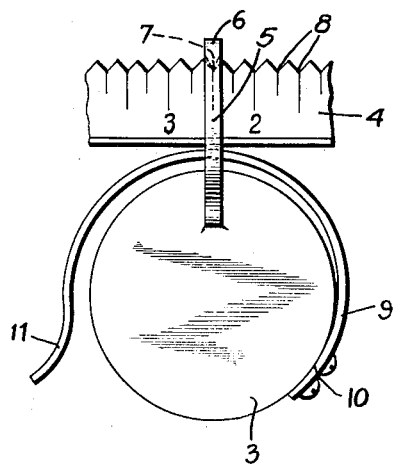
Fig. 1 is a vertical elevation of the poise and illustrates the manner of attaching it to the scale beam.
Figure 2:
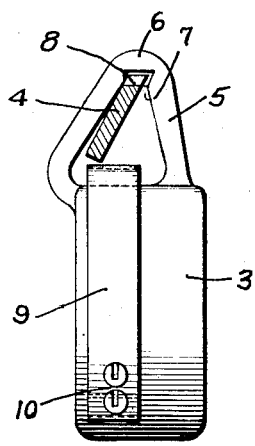
Fig. 2 is a side elevation of the poise viewed from the right in Fig. 1.

Poises may be divded into two general types both now well-known in the art. One type of poise comprises a mass of metal having a channel or passage for receiving the scale beam and for guiding the poise longitudinally of the beam. Such a poise usually has its mass approximately equally distributed with respect to the longitudinal axis of the beam and it is well known in the art to provide a poise of this type with means for preventing accidental displacement of the poise longitudinally.

The second type of poise may be said to be a pendant poise since the greater part of the mass making up the poise lies wholly below the scale beam from which it hangs by means of a stirrup or loop designed to rest in notches provided in the scale beam for the purpose of accurate positioning of the poise.

It is the latter type of poise with which the present invention is concerned rather than the first and it is believed to be broadly new to provide such a poise with means for preventing accidental displacement along the scale beam.

The poise 3 may be of any desired shape and the flat cylindrical design shown in the figures is purely illustrative of one form which it may take in practice. The poise 3 is supported upon the scale beam 4 by means of a stirrup or loop 5 which may be formed as an integral part of said weight or may be a separate member attached to the poise in any suitable and convenient manner.

The stirrup 5 is provided with portion 6 overlying and resting upon the scale beam 4, the portion contacting with the scale beam being provided with a knife edge or bearing 7 adapted to rest in the interdental spaces 8 in the scale beam. Were no means provided to prevent displacement of the poise 4 along the scale beam if accidentally struck, it might be possible to cause an error in weighing owing to an unobserved displacement of the poise caused by inadvertent contact by the operator or by a sudden jar produced by dropping the article being weighed upon the scale load receiving member after the poise has been set.

The means for preventing such accidental displacement of the poise relative to the selected beam graduation comprises a member 9 preferably composed of resilient material such as spring steel or spring brass and attached to the poise at 10 as by means of screws. It will be noted that the member 9 is formed with a somewhat semi-circular portion of substantially the same general contour as the poise but slightly eccentric to the center of the poise so that it ordinarily does not touch the poise except at the point 10 where it is fastened to the poise.

The member 9 extends upwardly and beneath the scale beam 4 but does not quite touch the beam, a slight amount of clearance being provided for which is less than the whole depth of any interdental space 8 and limits transverse movement of the poise relative to the beam to a degree sufficient to prevent longitudinal movement of the poise. This permits the poise to hang freely when the knife edge 7 rests in an interdental space 8 and allows enough free rocking movement to prevent any change in the location of the center of application of the downward force due to the weight of the poise as would be the case if the member 9 pressed directly against the lower edge of the beam.

The member 9 extends downwardly to the left, Fig. 1, and is provided with a reversely curved portion 11 adapted to serve as a finger grip. It will be obvious that pressure toward the right, Fig. 1, upon the finger piece 11 when the poise is grasped manually will move the portion underlying the beam 4 away from the beam an amount sufficient to permit shifting of the weight in either direction. As soon as the poise is set at the selected point on the beam the finger piece 11 is released whereupon the member 9 resumes its former position.

It will be readily seen that, owing to the amount of clearance between the member 9 and the beam 4 being less than the depth of the interdental spaces 8, the poise cannot be displaced longitudinally of the beam by any ordinary blow or a sudden vibration of the scale beam, except possibly by a blow which would be apt to cause damage to the scale. It appears from the foregoing that accidental displacement of the poise is prevented except when the weighing mechanism is misused, either deliberately or unintentionally.

Although this invention has been shown and described as applied in a particular form of embodiment, it is distinctly pointed out that the present invention is not limited thereto as it is capable of modifications within the scope of the claims which follow.

I claim:

1. A poise for use in conjunction with a notched scale beam, comprising a weight having integral therewith a loop surrounding the beam and cooperating pivotally with one of the notches of the beam, and a resilient member secured at one end to the poise and extending through the loop between the weight and the beam, said resilient member being spaced from the beam a distance sufficient to limit transverse movement of the weight relative to the beam to a degree insufficient to permit the loop to be disengaged from its cooperating notch thereby preventing longitudinal movement of the poise on the beam, the free end of said resilient member being adapted to be directly manually operated to move said member away from the beam a distance sufficient to permit disengaging the loop from its coacting notch and moving the poise longitudinally of the beam.

2. A poise for use in scales having notched scale beams comprising a weight adapted to have a pivotal connection to a notch in the scale beam and a resilient member secured to the weight, said resilient member extending in close proximity to the side of the scale beam opposite the notches and spaced from the beam a distance sufficient to prevent the weight from being disengaged from a cooperating notch in the beam and thereby preventing the weight from being moved longitudinally of the beam while permitting pivotal movement of the weight on the beam, said resilient member also having a portion thereof adapted to be operated by direct manual pressure on said portion to move said resilient member away from the beam a distance sufficient to permit the weight to be disengaged from its coacting notch in the beam and moved longitudinally of the latter.

THOMAS H. STRACHAN.